United States Patent [19]

Skillestad

[11] Patent Number: 4,723,510
[45] Date of Patent: Feb. 9, 1988

[54] LITTER COLLECTION MEANS

[75] Inventor: Regina Skillestad, Stockton, Calif.

[73] Assignee: Litter Screen, Inc., Lodi, Calif.

[21] Appl. No.: 820,159

[22] Filed: Jan. 21, 1986

[51] Int. Cl.4 ............................................. A01K 29/00
[52] U.S. Cl. ......................................................... 119/1
[58] Field of Search ............................................. 119/1

[56] References Cited

U.S. PATENT DOCUMENTS

| | | | |
|---|---|---|---|
| 3,809,013 | 5/1974 | Rigney et al. | 119/1 |
| 3,826,229 | 7/1974 | Classe et al. | 119/1 X |
| 3,978,818 | 9/1976 | Heldenbrand | 119/1 |
| 4,615,300 | 10/1986 | McDonough | 119/1 |

FOREIGN PATENT DOCUMENTS

| | | | |
|---|---|---|---|
| 2754620 | 6/1979 | Fed. Rep. of Germany | 119/1 |
| WO80/00077 | 3/1981 | PCT Int'l Appl. | 119/1 |

*Primary Examiner*—Robert P. Swiatek
*Attorney, Agent, or Firm*—Mark C. Jacobs

[57] ABSTRACT

A device for facilitating the removal of feline feces from a litter box, in which the device is disposed and upon which is placed kitty litter. The device comprises a plurality of semirigid sheets or films, all but one of which have a series of perforations therein. The perforations are sized to permit the sifting of kitty litter, but are adapted to not pass the feces therethrough. The feces are removed merely by lifting the film from the litter box.

7 Claims, 5 Drawing Figures

LITTER COLLECTION MEANS

BACKGROUND OF THE INVENTION

The disposition of fecal matter from household cats is not only a tedious and undesirable chore, necessitating the use of that favorite tool known as a pooper scooper. When the feces have been removed using such a tool it is oft times necessary to rinse the tool for obvious reasons, prior to placing it back in its normal storage location within the household. In addition, sometimes it is necessary to dump the litter and clean the box, if the cat's aim is not very good. There is a need therefore for an improved means of collecting and removing fecal matter from a litter box.

It is known to use kitty litter in litter boxes, and then to remove fecal matter deposited therein by the use of a shovel, pooper scooper or even with one's hand in a glove. In any event such a job is less than pleasant for the cat owner. There is a need therefore for an improved mode of collecting and disposing of fecal matter from litter boxes.

It is an object therefore to provide a device for the ready collection and removal of feline fecal matter.

It is another object of this invention to provide a device that can be easily and cheaply manufactured for use by cat owners.

Yet another object is to provide a device for the simple removal of fecal matter without disturbing the kitty litter of a litter box.

A yet further object is to provide a device which can be purchased quite inexpensively and which can be used by persons of all ages for the collection and removal feline feces.

Other objects of the invention will in part be obvious and will in part appear hereinafter. The invention accordingly comprises the product possessing the features, properties and the relation of components which are exemplified in the following detailed disclosure, and the scope of the application of which will be indicated in the claims.

For a fuller understanding of the nature and objects of the invention reference should be had to the following detailed description taken in conjunction with the accompanying drawings.

SUMMARY OF THE INVENTION

A device for collection of feline feces consisting of a series of superposed perforated self supporting plastic films, disposed upon a non-perforated film, all of which films are equally sized. The films include a base and generally upstanding sidewall(s) formed from a built in crease in the film, said films sized and configured to fit within a feline litter box.

DESCRIPTION OF THE PREFERRED EMBODIMENT

The invention herein comprises a self supporting, easily separable superposed plastic films, the lower most 12, of which is non-perforated, and the remaining of which, 11, include a series of perforations 15 in the base 13 thereof. The films are adapted to be placed in a feline litter box for the reception and easy collection of feces.

The invention comprises a series, preferably of 7, superposed plastic films, adapted to be placed in a litter box. The number 7 is selected in order to have sufficient films to last one week.

Figure 1A:
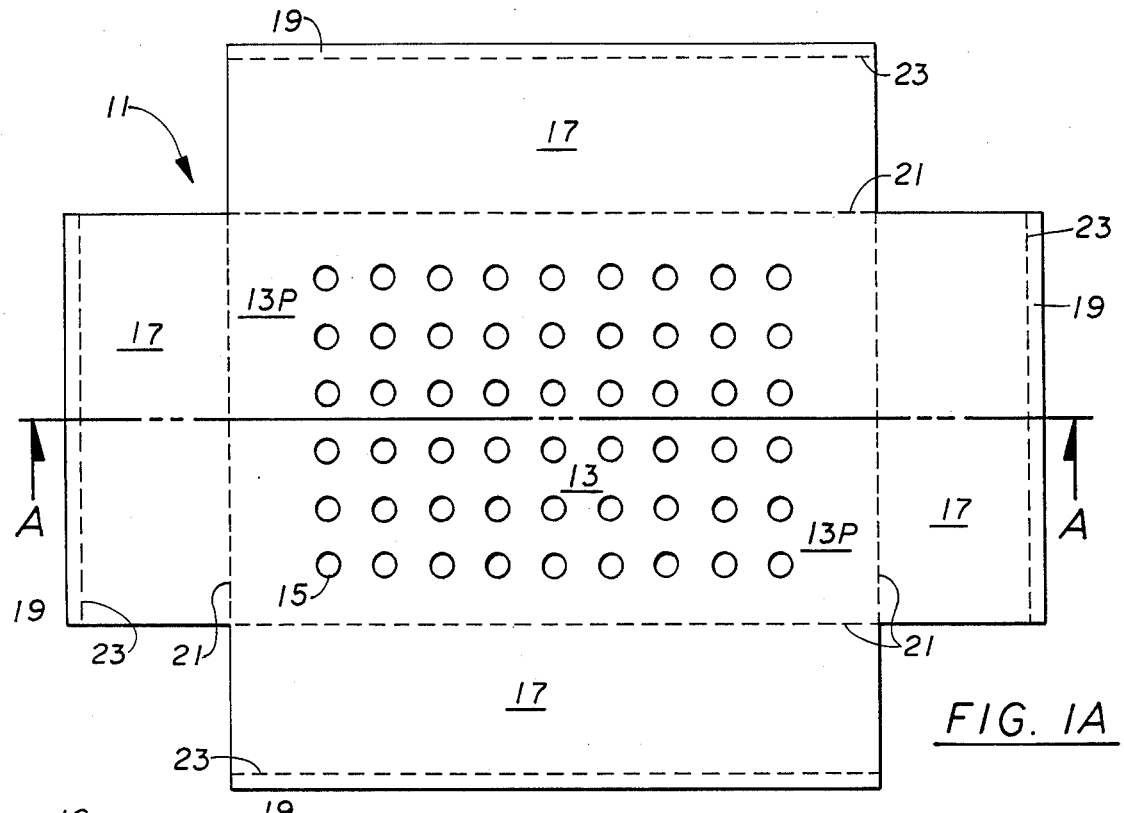
FIGS. 1A and 1B are a top plan view of one element of the invention.

The top 6 films 11, each include a base portion 13 having a series of perforations 15 therein. Typically each perforation 15' is a round hole of between $\frac{1}{4}''-\frac{3}{8}''$ in diameter. Other shaped perforations may also be employed. Each film 11 in addition to the base 13 includes, depending in the shape, at least one flap 17 that is integral with the base portion 13 and depends outward from said base 13, along upward crease 21. The term upward is used to signify that in the flat place of FIG. 1A, the fold of crease 21 would be toward the reader; while downward is away from the reader.

Preferably the perforated sheet film 11, is square or rectangular since most litter boxes are square or rectangular. Obviously triangular and circular films as well as multi-sided units are also contemplated within the scope of the invention.

Each flap 17 also includes an optional lip 19, that is formed along the downward crease 23 such that each lip 19 will extend outwardly.

Figure 1B:
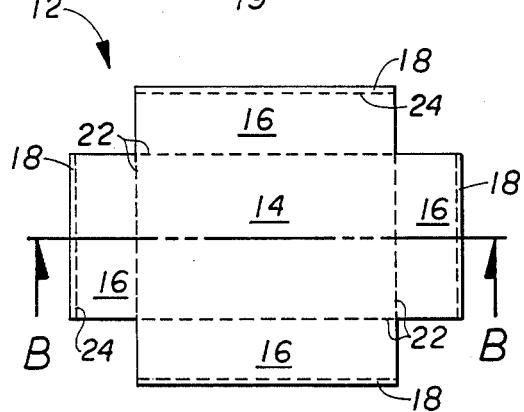

Turning now to FIG. 1B, it is seen that the unperforated film 12 is substantially similar to the perforated film 11 but for the perforations. Thus the film 12 includes a base portion 14, at least one flap 16 adapted to depend generally upwardly, being formed along crease 22. Each flap also includes an optional lip 18 formed along downward crease 24.

Figure 3:
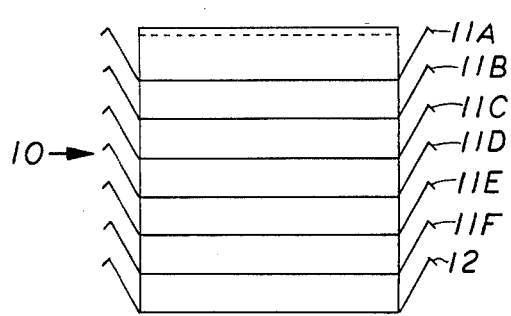
FIG. 3 is a sectional view taken along the line B—B of FIG. 1B, and along the line A—A showing a plurality of the elements of FIG. 1A superposed upon the element of FIG. 1B.

The plurality of films are sized with their base portion flaps being preferably the same to facilitate ease of manufacture. The series of films shown superposed, (stacked), ready for use are shown in cross section in FIG. 3. The perforated films 11 are disposed on top of the unperforated film 12.

Figure 4:
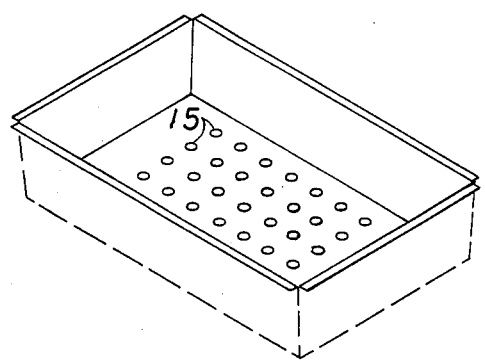
FIG. 4 is a top perspective view of the invention disposed within a litter box.

When disposed in a litter box such as the one designated 40, in FIG. 4, the invention is ready for use.

Figure 2:
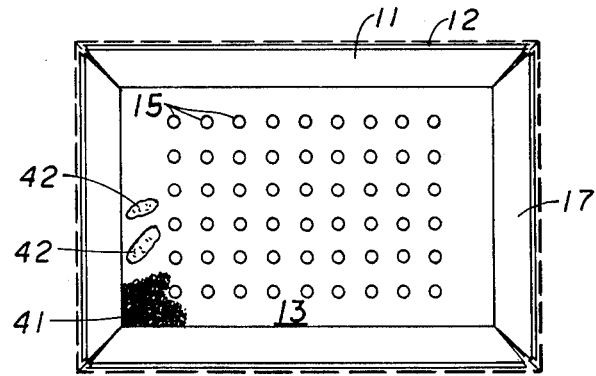
FIG. 2 is a top plan view of the second element of the invention.

The device of this invention is intended to replace the necessity for a pooper scooper. Thus one utilizes a clean litter box 40. Into it are placed the invention of this application. Reference is made to FIG. 2 wherein one perforated film 11 is shown disposed in superposed position over a non perforated sheet 12.

In FIG. 2 the optional lips 18 and 19 are not shown on the plastic sheets. For ease of understanding only one film 11 is depicted.

When placed in the litter box the flaps, here four, are kept upwardly along creases 21 of film 11 and 25 of film 22, to form a loosely configured box-like structure, with an open top, the corners of which are not joined together.

The bottom of the litter box is then filled with litter material such as vermiculite granules shown as 41 in FIG. 2.

The cat is then permitted to defecate and urinate in the litter box in normal fashion. At the end of day 1, the homeowner lifts the first box like structure from the litter box, by grabbing the flaps(s) 17 of the sheet (film)

11. Since the apertures 15 are significantly larger in diameter than the granules 41 of kitty litter, the kitty litter which may or may not be saturated with urine will pass through the apertures 15, if a minimum of care is expended to remove the film 11 such that the base portion 13 remains relatively parallel to the floor (i.e. untipped). The individual film 11 is then readily disposed such as in a paper or plastic bag with the fecal content 42 thereon.

Suitable materials for the self supporting films of this invention include semi rigid Mylar ® polyester and vinyl chloride, of from 10 to 20 gauge. They may be sprayed with an antistatic spray to enhance separation on the film layers 11.

Preferably the entire base 13 is not perforated. If a perimeter that is not perforated is preset, small feces, can be moved to that portion of the film by mere careful inclination of the film 11. Reference therefore should be made to FIG. 1A wherein a rectangular layout of 54 perforations 6×9 is shown, with a peripheral unperforated area designated 13P.

While 54 perforations are shown the actual number to be employed will depend on the size of the litter box. The sheet shown here is suitable for a typical plastic litter box as made by Hartz Mountain or others, having a base measuring 10¾×17¼ and which is about 4" deep.

The use of the optional tabs or lips 18 and 19 are recommended, as they help retain the side flaps upstanding, since the lips overlap the thickness or rim of the litter box and are disposed thereupon. If the flaps fall down and inwardly toward the base the purpose of neat and easy fecal matter removal is somewhat obviated.

Since certain changes may be made in the above article without departing from the scope of the invention herein involved, it is intended that all matter contained in the above description and shown in the accompanying drawings shall be interpreted as illustrative and not in a limiting sense.

I claim:

1. A device for the quick and easy removal of fecal matter from litter boxes which contain kitty litter, said device comprising a series of seven uniformly configured and sized rectangular semi-rigid films adapted for placement in the litter box prior to the addition of the kitty litter, each of which films has a rectangular base portion, a flap depending upwardly from the base portion in each of the four directions, each of which flaps is formed along a crease on said film, each of said flaps having a lip thereupon, said lip being formed along a crease in the one or more flaps of said film, one of said films having an imperforate base portion the remaining six of said films having a series of perforations therein sized to readily pass kitty litter therethrough, but not feline feces, which perforations form a rectangular pattern covering substantially the entire base portion, wherein the spacing between adjacent perforations is greater than the diameter of each perforation, and all of said perforations on adjacent films are aligned, the base portion of said lowermost film being a flat imperforate sheet, wherein when the series of films are stacked in the litter box, the plurality of series of perforations from all of the films are unobstructed thereby permitting access of litter directly to the lowermost film.

2. The device of claim 1 wherein the perforations of the perforated films are laid out in a grid of 6×9, and each perforation is circular.

3. The device of claim 1 further including a plastic film bag sized to receive the lowermost of said films upon the cleaning of the litter box.

4. A device for the quick and easy removal of fecal matter from litter boxes which contain kitty litter, said device comprising a series of uniformly configured and sized semi-rigid films adapted for placement in the litter box prior to the addition of the kitty litter, the members of the series to be stacked one atop another in a non-spaced relationship, all of said members of the series having a base portion; flaps depending upwardly from the base portion and formed along a crease in said film, the lowermost member of the series being an imperforate base portion, each of said remaining members of said series having a rectangular pattern of perforations covering substantially the entire area of the base wherein the spacing between adjacent perforations is greater than the diameter of each of the perforations;

and all of said perforations from all of the perforated members are in vertical alignment when said members are in the stacked condition, said perforations sized to readily pass kitty litter therethrough, but not feline feces, and wherein each of said flaps of all of said members has an outwardly extending lip thereupon, said lip being formed along a crease in the respective flap of said member;

whereby upon placement of the imperforate film's base portion in the bottom of the litter box and the remaining films base portions on the top thereof, with the flaps being folded to a generally upright position, the flaps will rest upon the peripheral top edge of the litter box, wherein when the members of the series are stacked in the litter box the plurality of perforations from all of the films are vertically unobstructed, thereby permitting access of litter directly to the lowermost member of the series.

5. The device of claim 4 further including a plastic film bag sized to receive the lowermost of said films upon the cleaning of the litter box.

6. The device of claim 4 wherein the base portion is rectangular and there are four flaps and wherein each flap has an outward extending lip thereupon.

7. The device of claim 6 wherein the film is made of polyester or vinyl chloride.

* * * * *